(12) United States Patent
Fitts, III

(10) Patent No.: US 7,104,742 B1
(45) Date of Patent: Sep. 12, 2006

(54) STRAIGHT-ALIGNING RAIL SYSTEM

(75) Inventor: Frank Fitts, III, Tuscaloosa, AL (US)

(73) Assignee: Fitts Industries, Inc., Tuscaloosa, AL (US)

( * ) Notice: Subject to any disclaimer, the term of this patent is extended or adjusted under 35 U.S.C. 154(b) by 0 days.

(21) Appl. No.: 10/417,625

(22) Filed: Apr. 17, 2003

(51) Int. Cl.
*F16B 43/02* (2006.01)
(52) U.S. Cl. .................. 411/537; 411/104; 411/389
(58) Field of Classification Search ........... 411/104, 411/537, 389, 538; 403/296
See application file for complete search history.

(56) References Cited

U.S. PATENT DOCUMENTS

| | | | | | |
|---|---|---|---|---|---|
| 1,345,358 | A | * | 7/1920 | Stillman | 403/390 |
| 2,789,457 | A | * | 4/1957 | Allen | 411/432 |
| 3,208,496 | A | * | 9/1965 | Phelan | 411/104 |
| 3,238,581 | A | * | 3/1966 | Sawyer | 24/71 T |
| 3,438,300 | A | * | 4/1969 | Blom et al. | 411/371.2 |
| 5,037,258 | A | * | 8/1991 | Heurteux | 411/104 |
| 5,095,668 | A | * | 3/1992 | O'Brien et al. | 52/184 |
| 5,333,978 | A | * | 8/1994 | Rives | 411/389 |
| 5,613,793 | A | * | 3/1997 | Dennis et al. | 403/256 |
| 5,613,968 | A | * | 3/1997 | Lin | 606/61 |
| 5,934,819 | A | * | 8/1999 | Mangold | 403/408.1 |

OTHER PUBLICATIONS

Staircrafters Plus, LLC installation hardware, http://staircrafters-plus.com/stair_parts.html?p=2358&b=2106, viewed Mar. 12, 2003 and Apr. 17, 2003.

* cited by examiner

*Primary Examiner*—Flemming Saether
(74) *Attorney, Agent, or Firm*—Karen B. Tripp

(57) ABSTRACT

A system for aligning and fastening two sections of stair hand rail or a fitting to a stair hand rail, comprising a bolt having screw threads at a first end for fastening the bolt to the fitting and having machine threads at a second end for aligning and fastening the fitting to the rail, the first end of the bolt being screwed the length of the screw threads into the fitting, the second end of the bolt being inserted through a bolt-receiving channel in the rail, a washer inserted through a tool chamber in the rail onto the second end of the bolt, and a nut inserted through the tool chamber in the rail onto the second end of the bolt, wherein the nut is pivoted on and against the washer while the nut is tightened until the desired fastening and alignment of the fitting to the rail is achieved.

2 Claims, 3 Drawing Sheets

STRAIGHT-ALIGNING RAIL SYSTEM

FIELD OF THE INVENTION

This invention relates to an aligning and fastening system. More particularly, the invention relates to a system for aligning and fastening adjacent handrails in a stairway or similar location.

BACKGROUND OF THE INVENTION

The installation of stair handrails has always included a variety of methods. Early construction included the use of joinery or joints similar to that of furniture construction. Puzzle-like joints were cut into the joining surfaces thereby fitting together as a key fits a lock. Hardware was later designed and most connections were done by a series of spline nails and wood glue. As structural safety requirements increased, newer hardware dedicated to the fastening of handrails and fittings, hanger bolts, washers, and nuts were adapted to these fastening points.

Connection of two wooden stair products, such as handrails, has in some fashion been performed by drilling a channel in one end of one of the handrails to accept a bolt. The bolt is then inserted into the channel of the handrail. The exposed lag end then becomes the "male" end of the connection. A channel is then drilled in the end of the second handrail to accept the "male" end of the bolt. A hole is then drilled in the bottom of the second handrail to facilitate the fastening operation. With the channel drilled, the installer is then able to slide the "male" end of the handrail into the channel of the second handrail. Using the hole in the bottom of the rail, the installer is then able to insert the washer and nut and use a wrench to tighten the nut and pull the two handrails together. In the original rail bolt systems, standard steel flat washers were used. These washers would secure upon the initial tightening, but if flexed from a side load would loosen a connection and cause a failure in structure.

Washers of a similar nature were later constructed of polyethylene plastic with a semicircular or half concave design. These washers were an improvement from original steel flat washers that would often bind during installation. Polyethylene plastic washers fit the inside shape of the hole that was drilled into the rail to establish a more firm connection. Issues with the plastic structure, however, included the failure of structure with high levels of torque, and the susceptibility of the washer to align off center inside of the hole in the base of the handrail.

Although there are several fastening systems currently on the market none have all of the desired features such as easy installation, alignment capabilities and stability when structural forces are applied.

For example, U.S. Pat. No. 5,095,668 (the 668 patent) by O'Brien describes and claims a fastening system for fastening a newel post to the floor. Although the 668 patent describes using a rail bolt, a washer and a nut, there are several distinguishing aspects. The newel post in the 668 patent is positioned perpendicularly to the floor creating a joining surface on a horizontal plane with the floor. The post sits on the solid support of the floor that is located directly beneath the post thereby giving the horizontal connecting surface stability and strength from downward forces.

The fastening system of the present invention, however, is for a vertical joint where handrails are set on spatially separated posts and the joint is not directly above any post. Downward forces on the rails create instability rather than the additional stability of the 668 installation. Additionally, the joint of the present invention may have an angular aspect if used on a staircase and that would increase the unwanted forces, specifically the side lateral loads.

Other differing factors between the 668 patent and the present invention include the alignment problem of adjacent handrails. The 668 system is for a vertical post attached to the floor while the present invention is for adjacent railings (and/or fittings and/or a system of fittings) that need to be properly aligned to appear as a single, level rail. The ability to align rails is not addressed by the 668 patent.

The washer disclosed by the 668 patent does not provide the strength and aligning characteristics of the washer of the present invention. Nothing in the 668 patent suggests the use of a washer that provides pivoting capabilities to align adjacent members.

Similarly, the rail bolt kit distributed by Staircrafters Plus (rail bolt kit N-3079) and manufactured by L. J. Smith Stair Systems does not contain a washer having the required pivotal characteristics nor does the kit disclose the need for such characteristics to facilitate alignment of handrails. The washer in the Staircrafters kit is flat on one side and, therefore, is not capable of allowing the pivoting action of the desired fastening system.

Additionally, the bolt in the N-3079 kit and in the 668 patent does not have the precision characteristics of the bolt of the present invention. The design of the bolt and integration of the thread types, thread lengths and number of threads on the bolt and the types of bolt endings provides for additional strength characteristics and ability to position the fitting and rail such that the desired alignment is obtained.

In general, the approach of the art has been to focus on a particular aspect and none of the above-described fastening systems found in the prior art have been able to adequately provide the easy installation, alignment capabilities and strength desired for handrail installations. It would, therefore, be a significant advancement in the art to provide an improved aligning and fastening system that provides all of these features.

SUMMARY OF THE INVENTION

This invention is directed to an improved fastening system for stair hand rails and stair hand rail fittings that is easy to install, provides pivoting capabilities to facilitate alignment of adjacent fittings and rails and provides a strong, stable connection that can withstand normally destabilizing forces. The system includes a bolt with screw threads at one end and machine threads for receiving a nut at the other end, a dual concave washer preferably comprised of ductile steel, and a nut. To install the system, the bolt is screwed into the fitting and the other end of the bolt is inserted into a bolt-receiving channel in the rail. The washer is inserted through a tool chamber in the rail and onto the bolt. A nut is then inserted through the tool chamber in the rail and onto the bolt where it is tightened against the washer, without binding, until the desired tightness and alignment of the fitting to the rail is achieved.

DESCRIPTION OF THE PREFERRED EMBODIMENT

Figure 1:
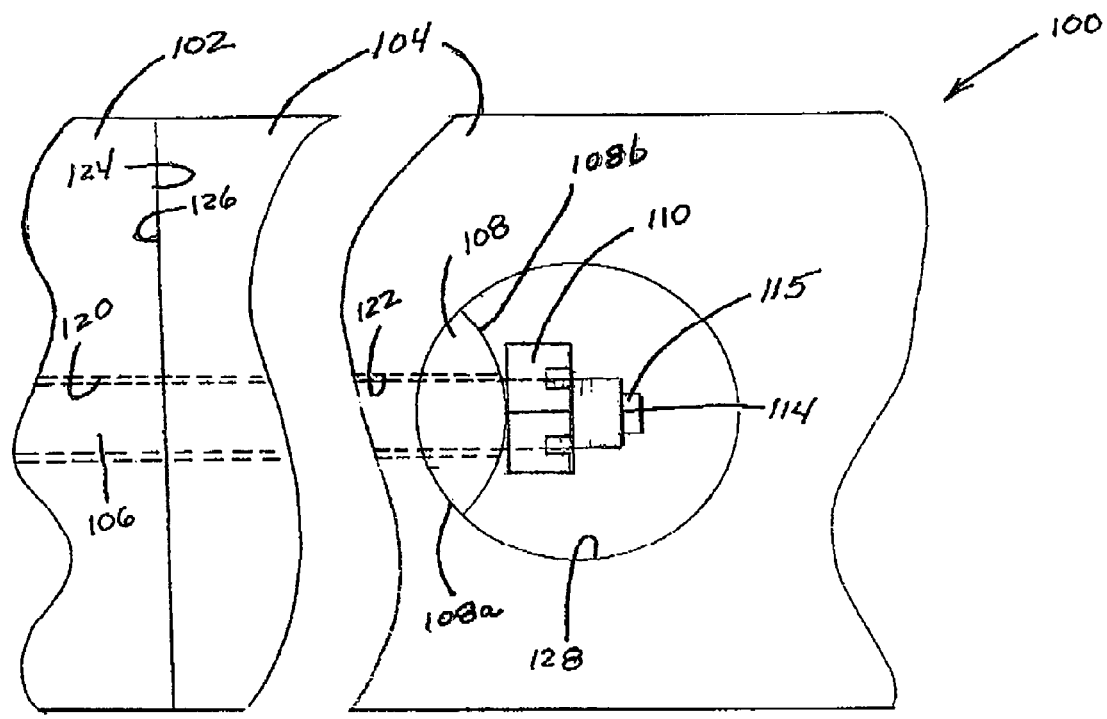
FIG. 1 is a bottom view of the aligning and fastening system of the present invention after installation.

FIG. 1 discloses a bottom view of an aligning and fastening system 100 connecting a fitting 102 to a rail 104 using a bolt 106, a washer 108 and a nut 110.

Figure 6:
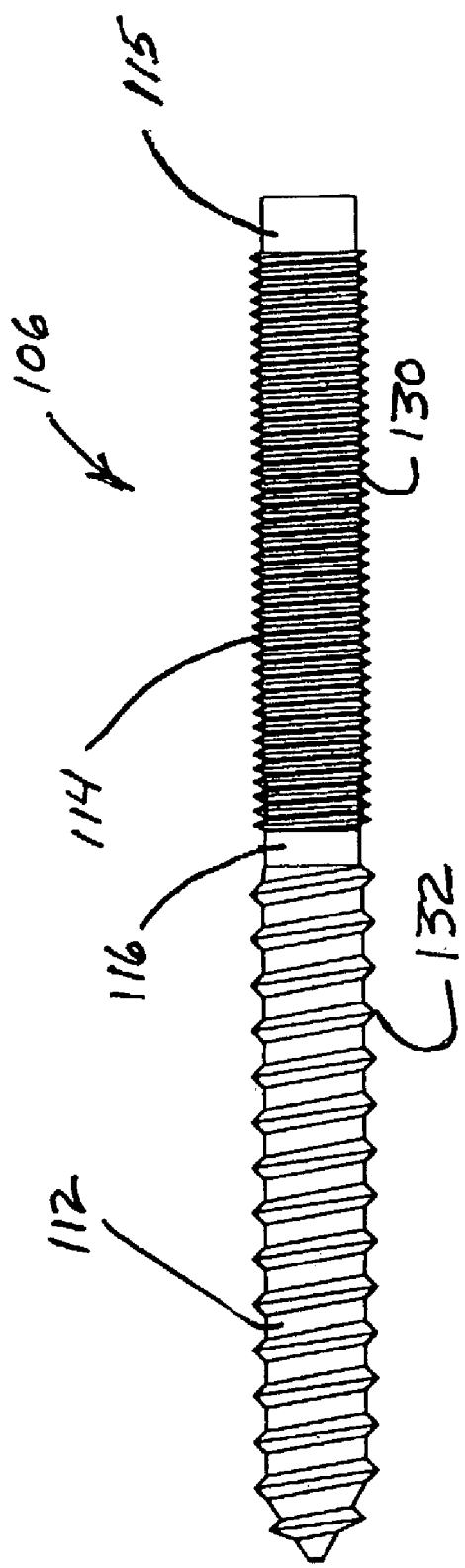
FIG. 6 is a side view of the bolt of the present invention.

In this embodiment, the bolt 106 is a steel, zinc-coated rail bolt, 3¾ inches long with a diameter of 5/16 inch—see FIG. 6. A first end 112 of the bolt 106 has 8.5 threads per inch for 1¾ inches with a front tip for use as a wood screw. A second end 114 of the bolt 106 ends in a dog point 115 and has 17.5 threads per inch for 1¾ inches. The first end 112 and the second end 114 of the bolt 106 are separated by a ¼-inch smooth center 116 with no threads. In this embodiment the washer 108 is an oblong ductile steel washer of a double convex design. The washer 108 is ⅞ inches wide by 23/32 inches long by 5/16 inches thick with a center aperture 118 having a diameter of 11/32 inches. In this embodiment, the nut 110 is a steel, zinc-coated ½-inch castellated nut. These dimensions are meant as way of example and are not meant to limit the scope of the invention.

Figure 2:
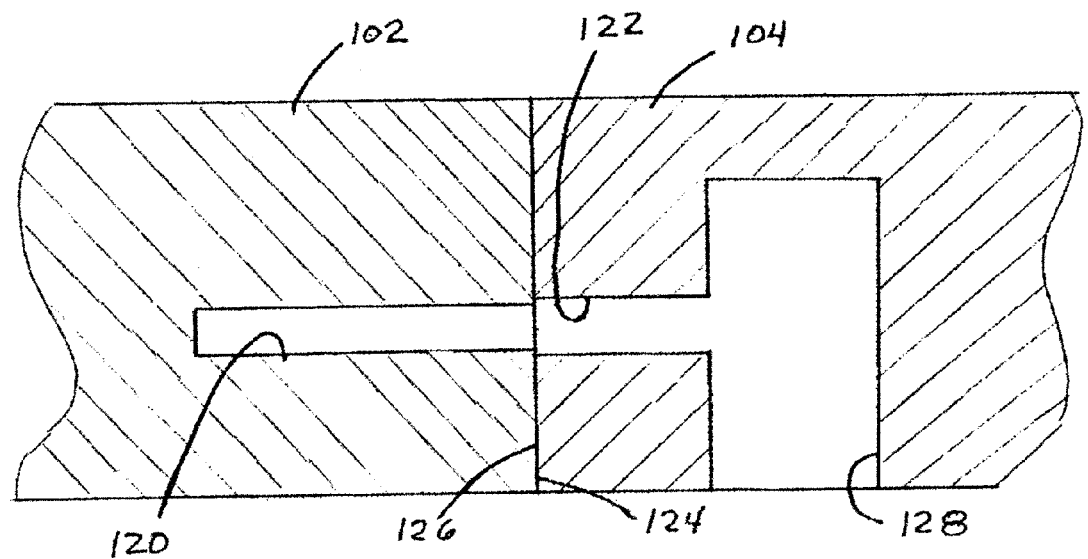
FIG. 2 is a sectional side view showing the bolt-receiving channels and the tool chamber of the present invention prior to installation.
Figure 3:
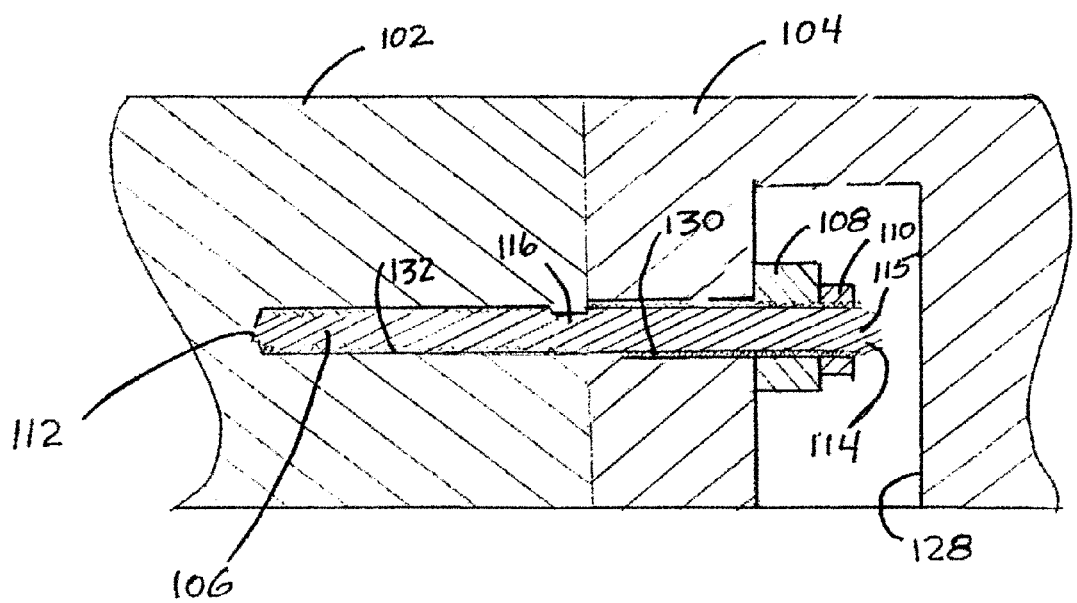
FIG. 3 is a sectional side view of the present invention showing the bolt, washer and nut after installation.

FIG. 2 is a sectional side view of the aligning and fastening system 100 showing the fitting 102 having a bolt-receiving channel 120 for receiving the first end 112 of the bolt 106 and the rail 104 having a bolt-receiving channel 122 for receiving the second end 114 of the bolt 106 and a tool chamber 128 for facilitating the installation of the washer 108 and the nut 110. The bolt 106, the washer 108 and the nut 110 are shown in FIG. 3.

Figure 4:
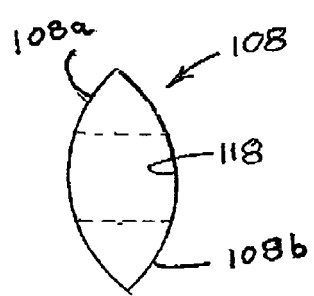
FIG. 4 is a top/bottom view of the washer of the present invention.
Figure 5:
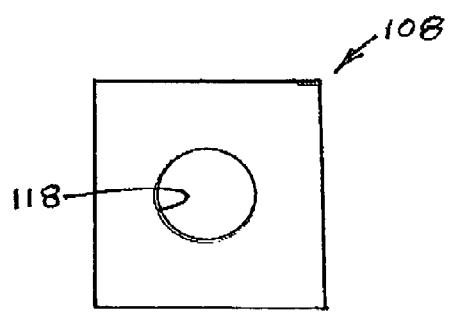
FIG. 5 is a side view of the washer of the present invention.

FIG. 4 is a top/bottom view of the washer 108 having dual, opposing convex sides 108a and 108b. The dual convex design and ductile steel construction of the washer 108 provide a more rigid pivot point than previous designs and prevent binding during levels of extreme torque. FIG. 5 is a side view of the washer 108 showing an aperture 118 through which the second end 114 of the bolt 106 passes.

FIG. 6 is a side view of the bolt 106 and illustrates the multi-faceted design of the bolt 106 including the screw threads 132 of the first end 112 of the bolt 106, the smooth portion of the center 116 of the bolt and the machine threads 130 and dog point 115 of the second end 114 of the bolt 106. By having the length of the bolt-receiving channel 120 of the fitting 102 approximately equal to the length of the first end 112 of the bolt 106 plus the length of the center 116 of the bolt 106, the first end 112 of the bolt 106 can be securely positioned within the fitting 102. In this embodiment, the bolt-receiving channel 120 is about 2 inches in length and about ¼ inch in diameter.

The length of the bolt-receiving channel 122 of the rail 104 and the positioning and dimensions of the tool chamber 128 of the rail 104 are determined by the length of the second end 114 of the bolt 106, the length and thickness of the washer 108 and the thickness of the nut 110. When the second end 114 of the bolt 106 is fully inserted through the bolt-receiving channel 122, the present invention provides clearance between the end of the bolt 106 and the wall of the tool chamber 128 such that the washer 108 can be inserted through the tool chamber 128 and positioned over the second end 114 of the bolt. Likewise, after insertion of the washer 108 through the tool chamber 128 and onto the bolt 106, the present invention provides clearance between the second end 114 of the bolt 106 and the wall of the tool chamber 128 for the insertion of the nut 110 through the tool chamber 128 and onto the second end 114 of the bolt 106.

Additionally, after placement of the washer 108 and the nut 110 on the bolt 106, the present invention provides adequate clearance between the second end 114 of the bolt 106 and the wall of the tool chamber 128 to allow the second end 114 of the bolt 106 to move closer to the wall of the tool chamber 128 as the nut 110 is tightened on the bolt 106 until the desired alignment and tightness is achieved.

To install the aligning and fastening system 100, as shown in FIG. 3, the first end 112 of the bolt 106 is screwed approximately 2 inches (see dimension discussion above) through a face 124 of the fitting 102 directly into the fitting 102 or into the bolt-receiving channel 120. The second end 114 of the bolt 106 is then inserted through a face 126 of the rail 104 into the bolt-receiving channel 122. The washer 108 is then inserted into the tool chamber 128 of the rail 104 and positioned over the second end 114 of the bolt 106. The nut 110 is then inserted into the tool chamber 128 of the rail 104 and positioned on the dog point 115 of the bolt 106 to facilitate the initial meshing of the nut 110 with the machine threads 130 on the bolt 106. The nut 110 is then turned and tightened against the washer 108, making use of the pivotal characteristics of the dual concave washer 108, until the desired alignment and tightness are attained.

Once the desired fit and alignment are achieved, the nut 110, the washer 108 and the bolt 106 can be loosened or removal and the fitting 102 and the rail 104 pulled apart so that glue can be applied to the faces 124–126 of the fitting 102 and the rail 104 for a more stable rail system. The washer 108 and the nut 110 are then put back on the second end 114 of the bolt 106 as described above, and tightened, without binding, until the desired alignment and stability are achieved.

It is anticipated that those skilled in the art of fastening and aligning technologies will recognize various other ways of practicing the invention and other uses of the invention. While the invention has been particularly shown and described with reference to the preferred embodiment thereof, it will be understood by those skilled in the art that various changes in form, detail and dimensions may be made therein without departing from the scope of the invention, as set forth in the following claims.

I claim:

1. A system for aligning and fastening a fitting to a rail having a tool chamber, said system comprising:
   a bolt having screw threads at a first end for fastening the bolt to the fitting and having machine threads at a second end;
   wherein the first end of the bolt is adapted to be screwed a predetermined length of the screw threads into the fitting;
   wherein the second end of the bolt is adapted to be inserted through a bolt-receiving channel in the rail;
   a washer having a first convex side, an opposing second convex side having parallel axis of curvature and a central aperture receiving the bolt;
   wherein the washer is adapted to be inserted through the tool chamber in the rail; and
   a nut having a generally flat bottom surface screwed onto the machine threads of the bolt,
   wherein, the flat bottom surface of the nut is tightened against the convex side of the washer adjacent the nut, without binding, for securing the fitting to the rail, while maintaining a desired alignment.

2. The system of claim 1, wherein the washer is made of ductile steel;

wherein the bolt is about 3¾ inches in length with a diameter of about 5/16 inches having the screw threads on the first end for a length of about 1¾ inches and the machine threads on the second end for a length of about 1¾ inches with a smooth unthreaded section of about ¼ inch between the screw and machine threads and;

wherein the washer is about ⅞ inches wide, about 23/32 inches long and about 5/16 inches thick with a central aperture of about 11/32 inch.

* * * * *